April 11, 1950     B. G. MORGAN     2,503,757
LAWN TRIMMER
Filed Oct. 12, 1946
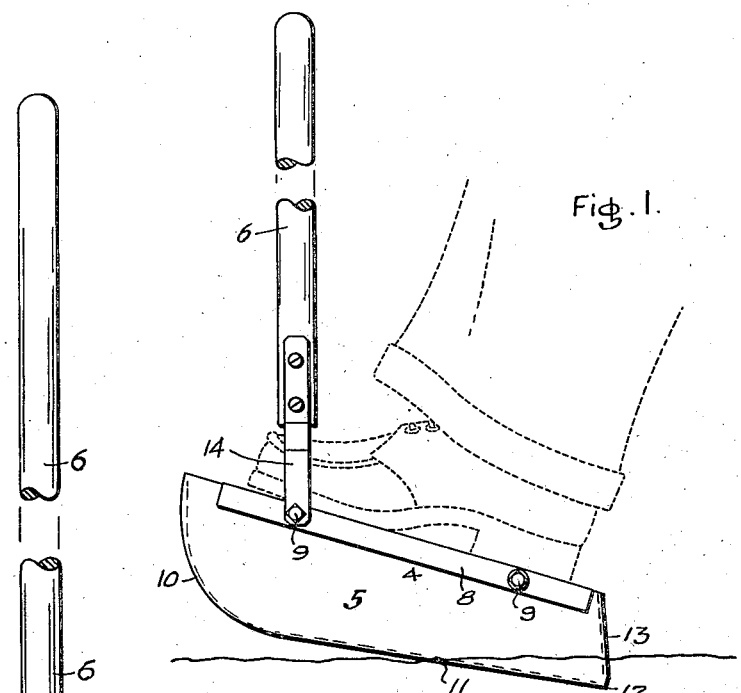
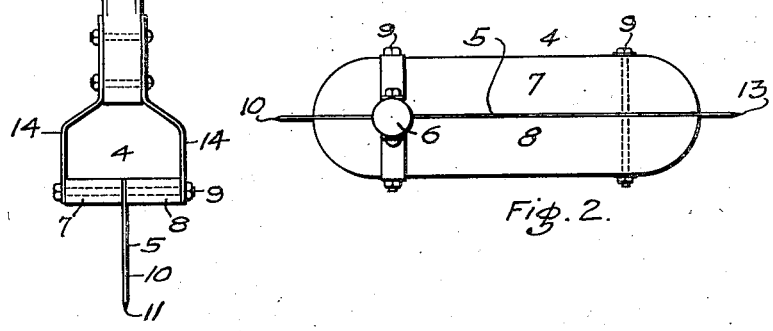
Burton G. Morgan
INVENTOR.
BY *[signature]*
ATTORNEY.

Patented Apr. 11, 1950

2,503,757

UNITED STATES PATENT OFFICE 2,503,757

LAWN TRIMMER

Burton G. Morgan, Tacoma, Wash.

Application October 12, 1946, Serial No. 703,030

2 Claims. (Cl. 30—315)

This invention relates to devices for cutting the edges of lawns, and has for its objects to provide a device of great simplicity which is cheap to make, easy to operate, and very effective in use.

I attain these and other objects by the devices and arrangements illustrated in the accompanying drawings, in which—

Fig. 1 is a general side view of my improved lawn trimmer in use; Fig. 2 is a plan view thereof; and Fig. 3 is a front elevation thereof.

Similar numerals of reference refer to similar parts throughout the several views.

Many devices have been made for the purpose of trimming lawns but most of them take considerable force to operate, cannot be made cheaply, and are complicated in construction.

Referring to the drawings, it will be seen that my improved trimmer consists of a platform 4, adapted to receive the operator's foot, a central knife blade 5 secured thereto, and a handle 6 pivoted thereto and extending upward therefrom to a position convenient to the operator's hands.

The platform 4 is composed of two pieces 7 and 8 of wood, of substantial thickness, positioned on each side of the knife blade 5. The pieces 7 and 8 are of the same width and of complementary shape. Two bolts 9 pass horizontally through holes in the parts 5, 7 and 8 and securely fasten the parts 7 and 8 together into a single plane, with the knife blade 5 between them.

The knife blade 5 extends a short distance in front of the forward end of the platform 4 and curves downward on a substantially circular arc 10 of about 90° to the bottom edge 11 which extends rearward under the platform 4 to the rear point 12, a short distance to the rear of the said platform. The rear edge 14 extends upward at an acute angle to the bottom edge 11 to the rear of the platform 4. The blade 5 is deeper at the front end of the edge 11 than at the heel. The edges 10, 11 and 13 are sharpened.

The handle comprises a wooden shank 6, of sufficient length to reach the hands of the operator, which is secured to a metal strap 14 on each side, said straps forming a loop adapted to pass over the toe of the operator's foot and hingedly secured to the platform by the front bolt 9, which passes through the holes therein.

The operation of my improved lawn trimmer is very simple and requires very little strength, being operable by youth as well as by adults. The handle 6 is firmly gripped and the knife blade placed on the line to be cut; then the foot is placed, with the toe under the loop formed by the handle straps 14 and the weight of the operator transferred to the platform 4, thus forcing the knife through the sod until the platform rests on the sod, or on the walk; then the handle is lifted and the foot and trimmer is moved forward to bring the knife to the next uncut area where the operation is repeated. Thus by a succession of short walking steps the lawn edge may be quickly trimmed with great ease. If extra resistance is met the operator may also press downward on the handle and, at the same time move the handle to one side and then the other. In some cases the handle may be given this sideways motion, as each cut is completed, to push the sod away from the walk, to leave a slight trench along its edge. In the case of trimming the edge of flower beds, the line should be trimmed along a predetermined line, the knife following said line.

It will be observed that the knife 5 is held in a vertical plane by the fact that the weight of the operator is applied equally on both sides thereof on the platform, and that the platform is of substantial thickness and the bolts tightly hold the knife at right angles to the platform, and the handle also holds the platform level.

Having described my invention, what I claim and desire to secure by Letters Patent, is:

1. A lawn trimmer comprising a vertical knife blade adapted to cut downward through the sod; a platform attached thereto along the upper edge of the blade and substantially of the same length as the blade, and of a width to receive the foot of the operator to apply his weight directly over the blade; and a handle pivoted to the front end of the platform and adapted to be held by the operator to steady the trimmer while in use and to raise the front end of the knife when moving the trimmer to its next operating position.

2. A lawn trimmer as set forth in claim 1, wherein the handle is pivoted to the platform sides through an intermediary loop, said loop spanning the foot of the operator, whereby the operator's foot is held in position as the trimmer is advanced from one position to the next operating position.

BURTON G. MORGAN.

REFERENCES CITED

The following references are of record in the file of this patent:

UNITED STATES PATENTS

| Number | Name | Date |
|---|---|---|
| 1,714,817 | Randleman | May 28, 1929 |

FOREIGN PATENTS

| Number | Country | Date |
|---|---|---|
| 692,503 | Germany | June 21, 1940 |